Figure 1:
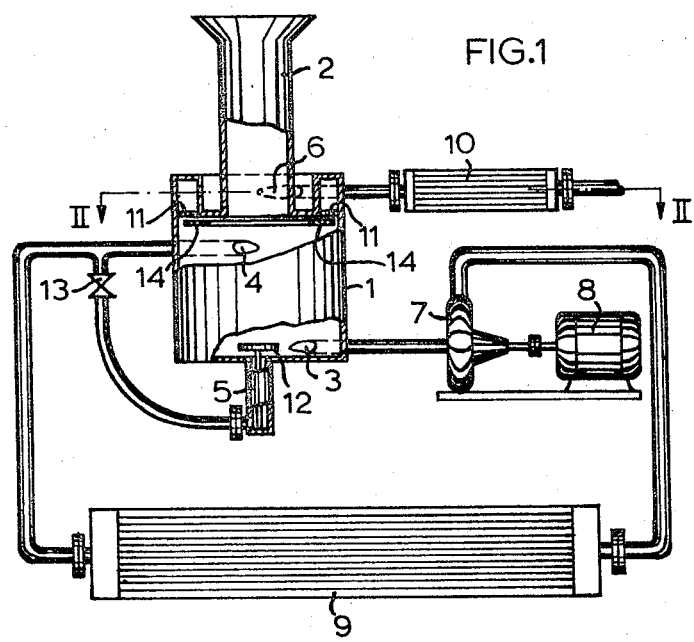

July 25, 1967 P. F. A. M. HENDRIKS 3,332,413

MELTING DEVICE AND PROCESS FOR MELTING UREA

Filed April 5, 1965

Inventor
Petrus F. A. M. Hendriks
By Cushman, Darby & Cushman
Attorneys

United States Patent Office 3,332,413
Patented July 25, 1967

3,332,413
MELTING DEVICE AND PROCESS FOR
MELTING UREA
Petrus F. A. M. Hendriks, Sittard, Netherlands, assignor
to Stamicarbon N.V., Heerlen, Netherlands
Filed Apr. 5, 1965, Ser. No. 445,678
Claims priority, application Netherlands, Apr. 9, 1964,
6,403,782
10 Claims. (Cl. 126—343.5)

The present invention relates to a process for melting materials, such as urea, which are not stable in the molten state. The present invention also relates to an apparatus for melting such materials in accordance with said process.

It is well known that when urea is heated to above its melting point, some biuret is formed. For certain applications of urea, only a small amount of biuret can be tolerated. Urea with a sufficiently low biuret content can be obtained from a urea solution containing biuret by crystallization. Most of the biuret will remain in the mother liquor leaving the crystalline mass relatively free of biuret. To change the crystalline mass low in biuret content into prills, for example, this mass must first be melted. Some biuret, however, will be formed during melting. As this formation of biuret proceeds more rapidly at higher temperatures, it is important that the melting process be carried out at the lowest possible temperature and also within the shortest possible period of time. To obtain the mutual presence of these two optimum conditions, it has been proposed to melt the urea by adding solid urea to molten urea and supplying the necessary melting heat by passing an electric current directly through the suspension. This method, however requires complicated and expensive equipment, and the cost of the energy required by such a method is very high.

It is, therefore, an object of the present invention to provide a novel process for continuously melting heat-sensitive materials, such as urea, economically and in a relatively short period of time.

It is another object of the present invention to provide a novel process for melting heat-sensitive materials with a minimum amount of thermal degradation.

It is still another object of the present invention to provide a novel process for melting heat-sensitive materials wherein intimate mixing and heat transfer are effected by a high-speed vortical flow.

It is a further object of the present invention to provide means for carrying out said process.

Other objects will be apparent to those skilled in the art from the following disclosure and claims.

The present invention provides an apparatus in which urea or other heat-sensitive materials can be continuously melted at low energy costs in a very short period of time at a relatively low average temperature. In this apparatus, the solid material to be melted is continuously added to a mixing vessel containing a body of partly or fully molten material. A part of this body of molten material is continuously circulated through a heating means and returned to the mixing vessel while a portion of the circulating flow is discharged. The solid material fed to this apparatus is preferably comminuted or in particle form.

In the present invention, intimate mixing and heat transfer are facilitated and effected by the establishment and maintenance of a high-speed vortical flow. This high-speed vortical flow is established and maintained by the use of a plurality of peripheral or circumferential inlets and outlets on the mixing vessel, and by the use of high-speed circulation of the circulating material.

In a preferred embodiment, the apparatus of the present invention comprises a mixing vessel which is provided with a plurality of circumferential inlets and outlets. An inlet at the top of this mixing vessel is provided for admitting the solid material to be melted. Part of the suspension in the vessel is pumped out and circulated through a heat exchanger and returned to the vessel via a circumferential inlet. The size of the pump used to circulate this suspension is such as to impart a velocity to the returning mass sufficient to cause a rapid rotation of the molten material within the vessel whereby intimate mixing is achieved. A portion of the material in the mixing vessel is continuously discharged through an outlet so constructed as to prevent the direct discharge of the fresh solid feed.

The size of the pump used to circulate the suspension is such as to impart a velocity to the returning mass sufficient to cause a vortical flow to be established and maintained within the mixing vessel. Generally, it is preferred to use a pump which will impart a centrifugal acceleration of from about 200 to about 900 m./sec.$^2$ to the mixture in the mixing vessel.

It will be apparent to a person skilled in the art that a number of modifications or substitutions can readily be made. For example, the mixing vessel may suitably be provided with a heating jacket to prevent solidification and caking of the molten material onto the surface of the vessel.

Figure 2:
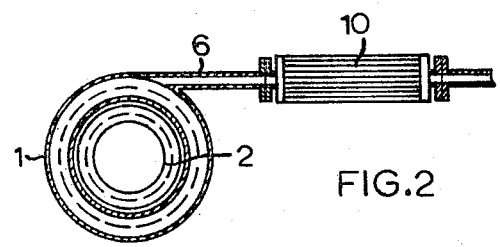

Referring now to the drawings, for further description of this invention:

FIGURE 1 represents a vertical view partly in section of a preferred embodiment of the apparatus of this invention; and FIGURE 2 is a plan view partly in section at line II—II in FIGURE 1.

In FIGURE 1, the mixing vessel 1 is suitably of a cylindrical construction. It is provided with a circular inlet 2 for admitting fresh solid feed, a circumferential outlet 3 for the circulating molten mass, a circumferential inlet 4 for the returning molten mass, a central inlet 5, and a circumferential discharge conduit 6.

When the apparatus is in operation, for example, when melting urea, mixing vessel 1 contains a suspension of solid urea particles in molten urea. This suspension is pumped continuously, by means of a pump 7 driven by a motor 8, from outlet 3 via steam heater 9 to the inlets 4 and 5. Fresh particulated solid urea is added through inlet 2. Part of the suspension is returned into the mixing vessel 1 through the central inlet 5, where the suspension is discharged through a distributor plate 12. A vortex is formed in mixing vessel 1 when the suspension circulates and the return of a part of the suspension through inlet 5 and distributor plate 12 will insure a proper mixing at the bottom of mixing vessel 1. The relative amounts of the suspension returned into mixing vessel 1 through inlets 4 and 5 can be regulated by means of a valve 13.

An overflow shelf 11 is fitted in mixing vessel 1. Fitted below and parallel to the overflow shelf 11 is a baffle ring 14, which virtually completely excludes the direct discharge of fresh solid urea particles. The outer diameter of the baffle ring 14 is substantially smaller than the outer diameter of overflow shelf 11, but larger than the inner diameter of the overflow shelf 11. A portion of the circulating suspension, corresponding substantially to the amount of solid urea fed in, is withdrawn from the apparatus via the circumferential discharge conduit 6.

Since the suspension discharged from the conduit 6 may contain some suspended solid particles, a heat exchanger 10 may be provided for the complete melting of such solid particles. If urea is the material being melted and the melt is to be prilled, heat exchanger 10 may be omitted as it is unnecessary to melt the urea completely before prilling; it is possible to spray a suspension of solid urea particles in molten urea into prills.

When the above apparatus is used to melt urea, solid urea is preferably fed into the mixing vessel at such a rate so that solid urea particles are always present in the circulating flow which is maintained so that the mean residence time of the urea in the melting device is less than 1 minute. The concentration of solid particles in the circulating flow of urea is preferably less than 20% by weight to avoid plugging.

When the suspension enters the mixing vessel through inlet 4, a part of the kinetic energy of the suspension is used to effect the mixing. To compensate for the loss in velocity, the cross-sectional area of outlet 3 can be made larger than the cross-sectional area of inlet 4.

*Example*

The device described above was used to melt crystalline urea. About 10 kg. of urea crystals were fed into the mixing vessel per minute. About 100 kg. of suspension were circulated by pumping. About 87 kg. of the suspension were returned via inlet 4 and 13 kg. of the suspension returned via inlet 5. The centrifugal acceleration of the suspension in the mixing vessel was 500 m./sec.$^2$. The temperature of the crystals was 80° C. and the temperature of the melt after it leaves heat exchanger 10 was 136° C. A prilling mechanism was placed immediately behind heat exchanger 10. The mean time required for melting the crystals and prilling the melt was 45 seconds. The biuret contained in the prills was only 0.1% by weight higher than that present in the solid urea feed.

The invention has been described in detail with reference to the preferred embodiments thereof, but it will be understood that variations and modifications can be effected within the spirit and scope of the invention as described hereinabove and as disclosed by the appended claims.

What is claimed is:

1. Apparatus adapted for continuously converting a heat-sensitive material from the solid to the molten state, comprising:
   means defining an axially symmetrical confined space for continuously receiving a supply of said material,
   substantially tangential inlet means for continuously delivering a supply of at least partially molten material into said space,
   outlet means for continuously withdrawing at least a portion of the material from said confined space means,
   a heating zone for heating at least a portion of said material to convert the same to the molten state,
   conduit means communicating with said space and said heating zone, said conduit means also communicating said heating zone and said substantially tangential inlet means
   and means for circulating material withdrawn through said conduit means from said space into said heating zone, and for returning the same to said space at least partly via said tangential inlet means, said means for circulating and said tangential inlet means being so capacious as to effect a high speed vortical flow of said at least partially molten material within said confined space about the symmetry axis thereof at a centrifugal acceleration of at least about 200 meters per second squared.

2. Apparatus adapted for continuously melting a heat-sensitive material comprising:
   a mixing means adapted for receiving and mixing solid particles of said material with a supply of at least partially molten material,
   heating means disposed externally of said mixing means,
   and circulating means communicating with said heating means and said mixing means for circulating said material from said mixing means to said heating means and for returning the same to said mixing means,
   said mixing means comprising an axially symmetrical mixing vessel, an inlet means on said mixing vessel for receiving solid particles of said material, an outlet conduit on said mixing vessel peripherally thereof with respect to the vessel symmetry axis and communicating with said circulating means, a substantially tangential inlet conduit on said mixing vessel communicating with said circulating means, said circulating means and said substantially tangential inlet conduit being so capacious as to effect a high speed vortical flow of said at least partially molten material within said vessel about the symmetry axis thereof at a centrifugal acceleration of at least about 200 meters per second squared and discharging means for discharging a portion of the mixture in said mixing vessel.

3. Apparatus of claim 2 wherein said mixing vessel comprises a cylindrical vessel having a centrally disposed inlet, said centrally disposed inlet communicating with said circulating means for returning a portion of said mixture to said mixing vessel.

4. Apparatus of claim 2 wherein said mixing vessel further comprises a means for heating said mixing vessel.

5. Apparatus adapted for continuously melting a heat-sensitive material comprising: a mixing means adapted for receiving and mixing solid particles of said material with a supply of at least partially molten material; heating means disposed externally of said mixing means; and circulating means communicating with said heating means and said mixing means for circulating said material from said mixing means to said heating means and for returning the same to said mixing means, said mixing means comprising an axially symmetrical mixing vessel, an inlet means on said mixing vessel for receiving solid particles of said material, an outlet conduit on said mixing vessel peripherally thereof with respect to the vessel symmetry axis and communicating with said circulating means, a substantially tangential inlet conduit on said mixing vessel communicating with said circulating means, and discharging means for discharging a portion of the mixture in said mixing vessel; said cylindrical vessel having a centrally disposed inlet communicating with said circulating means for returning a portion of said mixture to said mixing vessel; said discharge means comprising an overflow shelf positioned in said mixing vessel above said circumferential inlet conduit, and a circumferential discharge conduit positioned above said overflow shelf.

6. Apparatus of claim 5 wherein said discharge means further comprising a baffle ring positioned in said mixing vessel between said overflow shelf and said circumferential inlet conduit, said baffle ring having an outer diameter between the outer and inner diameters of said overflow shelf.

7. A continuous process for melting a heat-sensitive material comprising adding solid particles of said material to a body of at least partially molten material in a mixing vessel, establishing and maintaining a vortical flow of the resulting mixture of solid and molten material in said mixing vessel at a centrifugal acceleration of at least about 200 meters per second squared, circulating a portion of said mixture through a heating means, returning the circulating mixture to said mixing vessel substantially tangential to effect the mixing, and discharging a portion of the mixture from said mixing vessel.

8. The process of claim 7 wherein the adding step essentially consists of adding solid urea particles to a body of at least partially molten urea.

9. The process of claim 8 including performing the adding, circulating, returning and discharging steps at so rapid a rate that the mean residence time of the material in the mixing vessel is at most about one minute.

10. The process of claim 8 including establishing and maintaining such a proportion between the amount of material added in the adding step and the amount of mixture discharged in the discharging step that the concentration of solid particles in the circulating mixture is between 0 and 20 percent by weight of the circulating mixture.

References Cited

UNITED STATES PATENTS 3,193,264  7/1965  Rummel _____ 263—11

OTHER REFERENCES

Felten, German printed application No. 1,090,356, pub. Oct. 6, 1960, Class KL. 22h 1/01.

CHARLES J. MYHRE, *Primary Examiner.*